(12) United States Patent
Manzen

(10) Patent No.: US 9,641,671 B2
(45) Date of Patent: May 2, 2017

(54) NOTIFYING DEVICES, NOTIFYING METHODS, AND PROGRAMS

(75) Inventor: Yoshihisa Manzen, Kanagawa (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 14/128,817

(22) PCT Filed: Jun. 22, 2012

(86) PCT No.: PCT/JP2012/065976
§ 371 (c)(1),
(2), (4) Date: Dec. 23, 2013

(87) PCT Pub. No.: WO2013/005583
PCT Pub. Date: Jan. 10, 2013

(65) Prior Publication Data
US 2014/0135074 A1  May 15, 2014

(30) Foreign Application Priority Data
Jul. 6, 2011  (JP) ................. 2011-150301

(51) Int. Cl.
*H04M 1/00* (2006.01)
*H04M 3/02* (2006.01)
*H04M 19/04* (2006.01)

(52) U.S. Cl.
CPC .......... *H04M 3/02* (2013.01); *H04M 19/047* (2013.01); *H04M 2250/12* (2013.01)

(58) Field of Classification Search
CPC .. H04M 3/02; H04M 2250/12; H04M 19/044; H04M 1/72569; H04M 19/047; H04M 1/72566; H04M 1/72572; H04M 17/72566; H04W 68/00; H04W 4/10; H04N 7/17309; H04N 21/262; H04N 21/26603;
(Continued)

(56) References Cited

U.S. PATENT DOCUMENTS 6,968,216 B1 *  11/2005  Chen ................. H04M 1/72566
                                                       455/566
2002/0010008 A1 *  1/2002  Bork .................. H04M 19/041
                                                       455/567
(Continued)

FOREIGN PATENT DOCUMENTS

JP  2000-333251 A    11/2000
JP  2004-289951      * 10/2004   ............. H04M 1/00
(Continued)

OTHER PUBLICATIONS

International Search Report corresponding to International Application No. PCT/JP2012/065976, dated Sep. 4, 2012, 3 pages.
(Continued)

*Primary Examiner* — Mahendra Patel
(74) *Attorney, Agent, or Firm* — Wilmer Cutler Pickering Hale and Dorr LLP

(57) ABSTRACT

A notifying device according to the present invention includes a plurality of vibration means (4, 5) that generate vibrations in at least one different direction; attitude detection means (2) that detects an attitude of its own device; and selection means (3) that selects which vibration means from among the plurality of vibration means (4, 5) is to be operated based on the attitude.

9 Claims, 4 Drawing Sheets

(58) Field of Classification Search
CPC ............... H04N 21/84; H04N 21/4131; H04N 21/41407; H04N 21/812; H04N 21/2747
USPC ...... 455/567, 575.1, 456.4, 412.2, 458, 347, 455/172, 428, 433, 411, 417, 427, 528, 455/426.1, 430, 439
See application file for complete search history.

(56) References Cited

U.S. PATENT DOCUMENTS

| | | | | |
|---|---|---|---|---|
| 2002/0198004 | A1* | 12/2002 | Heie | H04W 4/02 455/456.1 |
| 2004/0266491 | A1* | 12/2004 | Howard | H04H 20/86 455/567 |
| 2005/0265690 | A1* | 12/2005 | Kawasaki | H04N 7/17309 386/201 |
| 2006/0116175 | A1* | 6/2006 | Chu | H04M 1/72569 455/567 |
| 2006/0153358 | A1* | 7/2006 | Zernovizky | H04M 19/044 379/392.01 |
| 2007/0156289 | A1* | 7/2007 | Altieri | G01M 1/22 700/280 |
| 2009/0167542 | A1* | 7/2009 | Culbert et al. | 340/635 |
| 2010/0139576 | A1* | 6/2010 | Kim | A01K 15/023 119/721 |
| 2010/0204877 | A1* | 8/2010 | Schwartz | B60R 25/00 701/31.4 |
| 2010/0312297 | A1* | 12/2010 | Volpe | A61B 5/0404 607/6 |
| 2012/0026523 | A1* | 2/2012 | Miura | G06K 15/00 358/1.13 |
| 2012/0151420 | A1* | 6/2012 | Amento | G06F 3/017 715/863 |

FOREIGN PATENT DOCUMENTS

| | | | | |
|---|---|---|---|---|
| JP | 2004-289951 | A | 10/2004 | |
| JP | 2004289951 | A * | 10/2004 | ............... H04M 1/00 |
| JP | 2004-305865 | A | 11/2004 | |
| JP | 2008-092164 | A | 4/2008 | |
| JP | 2009-016976 | A | 1/2009 | |
| JP | 2009-206857 | A | 9/2009 | |
| JP | 2010-200036 | A | 9/2010 | |

OTHER PUBLICATIONS

Japanese Office Action issued by the Japan Patent Office for Application No. 2013-522812 dated Jun. 14, 2016 (4 pages)

* cited by examiner (a)  (b)

(a)　　　　　　　　　　　(b)

(a)          (b)

NOTIFYING DEVICES, NOTIFYING METHODS, AND PROGRAMS

CROSS-REFERENCE TO RELATED APPLICATIONS

This application is a national stage application of International Application No. PCT/JP2012/065976 entitled "Notifying Devices, Notifying Methods, and Programs," filed on Jun. 22, 2012, which claims the benefit of the priority of Japanese patent application No. 2011-150301, filed on Jul. 6, 2011, the disclosures of each of which are hereby incorporated by reference in their entirety.

TECHNICAL FIELD

The present invention relates to notifying devices and notifying methods that notify users of information and also to programs that cause computers to execute the notifying methods.

BACKGROUND ART

With the dramatic proliferation of mobile phones in recent years, phone etiquette has become an important issue. In public places such as trains and buses and working places such as working rooms and meeting rooms, it is a common practice for the user of a mobile terminal to set it for an etiquette mode where it becomes silent and vibrates when it is receiving an incoming call. Of course, if the user carries the mobile terminal placed in a pocket of his or her clothing, no problem would occur. However, if the user has placed it on a desk or the like, it would vibrate on the desk or the like and create an unpleasant, rattle like sound. Next, with reference to the accompanying drawings, this problem will be described in detail.

FIG. 1 is a block diagram exemplifying the structure of a mobile terminal according to related art. FIG. 2 shows schematic diagrams describing the operation of a vibrator of a mobile terminal shown in FIG. 1.

As shown in FIG. 1, mobile terminal 90 has eccentric member 84; motor 83 that drives eccentric member 84; motor control circuit 82 that drives motor 83; and CPU (Central Processing Unit) 81 that controls motor control circuit 82. FIG. 2(a) is a perspective view showing appearance of mobile terminal 90 shown in FIG. 1. Mobile terminal 90 is a foldable mobile phone composed of lid section 91 and body section 92. FIG. 2(a) shows that lid section 91 is in the open state. Assuming that body section 92 formed in a rectangular parallelepiped shape has been placed horizontal on a desk in the state shown in FIG. 2(a), in which the shorter side direction of body section 92 is the X axis direction, and the longer side direction of body section 92 is the Y axis direction, the operation surface of body section 92 becomes perpendicular to the Z axis direction.

FIG. 2(b) is a schematic diagram showing substrate 95 provided in body section 92 of mobile terminal 90 that has been placed on a desk in the state shown in FIG. 2(a). As shown in FIG. 2(b), motor 83 is mounted on substrate 95 in parallel with the longer side of body section 92 of mobile terminal 90. Eccentric member 84 is mounted on the spindle of motor 83. The direction of the spindle of motor 83 matches the Y axis. If mobile terminal 90 that has been set for the etiquette mode is receiving an incoming call, CPU 81 transmits a control signal to motor control circuit 82 such that it drives motor 83. When motor control circuit 82 receives the control signal from CPU 81, motor control circuit 82 drives motor 83. When motor 83 rotates eccentric member 84, mobile terminal 90 generates vibrations and thereby the user knows that mobile terminal 90 is receiving an incoming call.

At this point, since eccentric member 84 rotates about an axis in parallel with the Y axis direction as shown in FIG. 2, the vibration direction becomes parallel to the XZ plane. If the user carries mobile terminal 90 placed in a pocket of his or her clothing, since the XZ plane of mobile terminal 90 becomes perpendicular to the user's skin, vibrations of mobile terminal 90 are easily transferred to the user's body. In contrast, if the user has placed mobile terminal 92 on a desk or the like, since the XZ plane of mobile terminal 90 becomes perpendicular to the surface of the desk, mobile terminal 92 vibrates and creates an unpleasant rattle-like sound.

Patent Literature 1 discloses a technique according to which a user is notified of an incoming call through a visual means whose goal is to solve the problem in which, if the mobile terminal that is placed on a desk receives an incoming call, the mobile terminal will vibrate and disturb the surrounding people due to the unpleasant sound that is generated.

RELATED ART LITERATURE

Patent Literature

Patent Literature 1: JP2008-92164A, Publication

SUMMARY OF INVENTION

In the mobile terminal disclosed in Patent Literature 1, if the mobile terminal placed on a desk is hidden from the view of the user because of a document or the like, the user will not know that the mobile terminal is receiving an incoming call.

An exemplary object of the invention is to provide notifying devices and notifying methods that notify the users of an incoming call through vibrations in which unpleasant sounds are prevented even if the devices have been placed horizontal on desks and hidden from the users' view and also provide programs that cause computers to execute programs in accordance with notifying methods.

A notifying device according to an exemplary aspect of the invention includes a plurality of vibration means generating vibrations in at least one different direction; attitude detection means detecting an attitude of its own device; and selection means selecting which means from among the plurality of vibration means is to be operated based on the detected attitude.

A notifying method according to an exemplary aspect of the invention includes detecting an attitude of a notifying device; and selecting which vibration means, from among a plurality of vibration means, generates vibrations in at least one different direction, that is to be operated based on the detected attitude.

A program according to an exemplary aspect of the invention is a program causing a computer to control a plurality of vibration means that generate vibrations in at least one different direction, the program including detecting an attitude of a notifying device including the plurality of vibration means; and selecting which vibration means from among the plurality of vibration means is to be operated based on the detected attitude.

DESCRIPTION OF EMBODIMENTS

Figure 1:
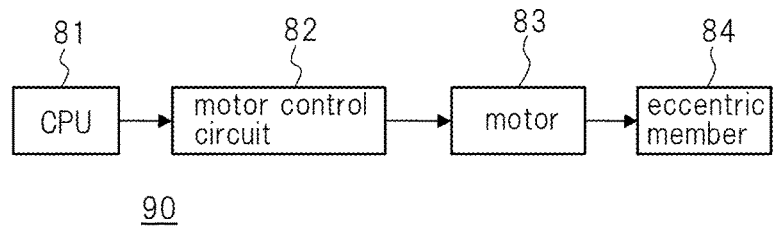
FIG. 1 is a block diagram exemplifying the structure of a mobile terminal according to related art.
Figure 2:
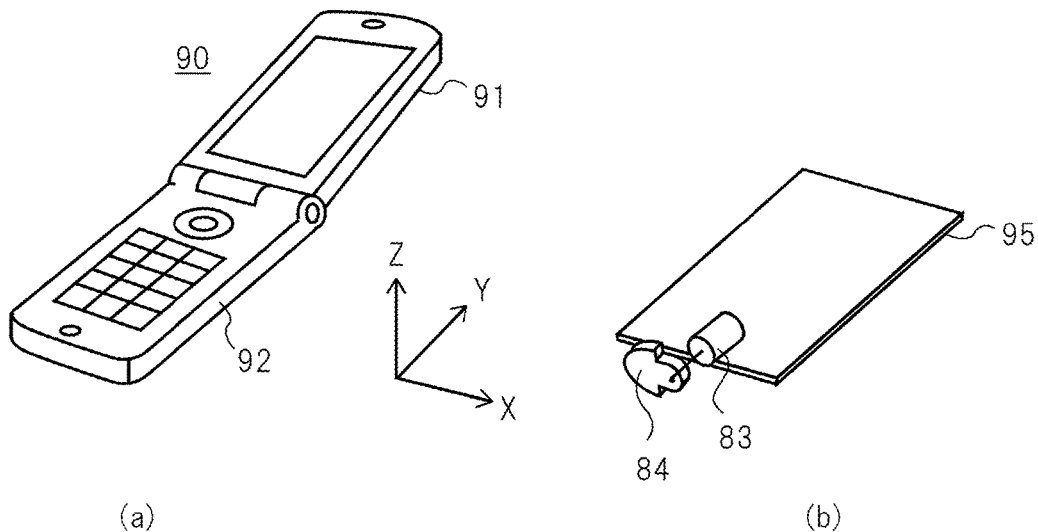
FIG. 2 shows schematic diagrams describing the operation of a vibrator of the mobile terminal shown in FIG. 1.
Figure 3:
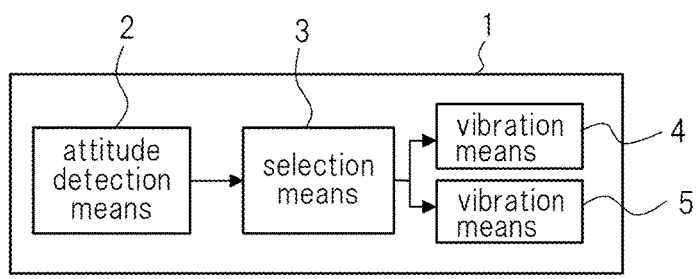
FIG. 3 is a block diagram exemplifying a notifying device according to an embodiment of the present invention.

Next, the structure of a notifying device according to an embodiment of the present invention will be described. FIG. 3 is a block diagram exemplifying the notifying device according to the embodiment of the present invention.

As shown in FIG. 3, notifying device 1 has attitude detection means 2 that detects the attitude of notifying device 1; vibration means 4 and vibration means 5; and selection means 3 that selects which of these vibration means to operate. Vibration means 4 and vibration means 5 generate vibrations in at least one different direction.

Figure 4:
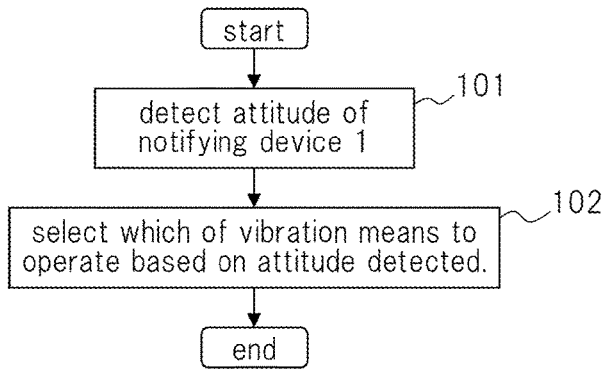
FIG. 4 is a flow chart showing the procedure of the notifying device shown in FIG. 3.

Next, the operation of the notifying device shown in FIG. 3 will be described. FIG. 4 is a flow chart showing the procedure of the notifying device shown in FIG. 3.

Attitude detection means 2 detects the attitude of notifying device 1 (at step 101). If there is information concerning which notifying device 1 needs to notify the user, selection means 4 selects vibration means 4 or vibration means 5 to be operated based on the detected attitude of the device at step 101 (at step 102).

Although the foregoing notifying device can be applied to a mobile terminal, it may be applied to a device such as a game machine, a tablet PC (Personal Computer), or a note PC besides a mobile phone including a smartphone.

First Embodiment

Next, the structure of a mobile terminal according to a first embodiment of the present invention will be described. In this embodiment, assuming that the mobile terminal is a mobile phone having a vibration function, the structure of the notifying method according to the present invention will be described in detail. However, descriptions concerning the structure and operation of a radio communication function, will be omitted.

Figure 5:
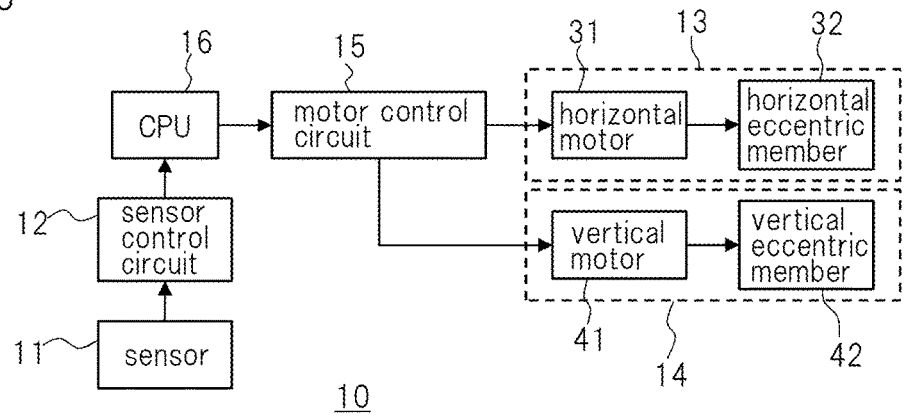
FIG. 5 is a block diagram exemplifying the structure of a mobile terminal according to a first embodiment of the present invention.
Figure 6:
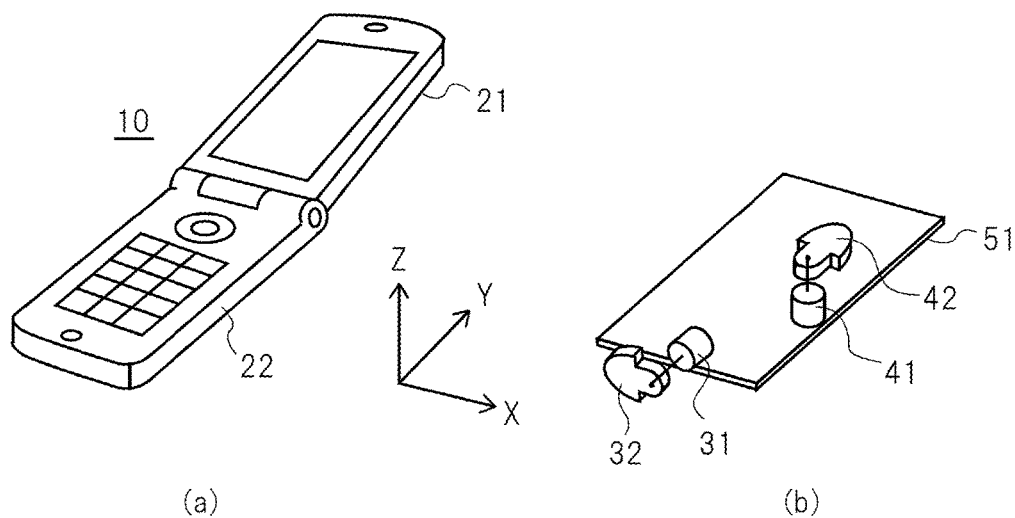
FIG. 6 shows schematic diagrams describing the operation of a vibrator of the mobile terminal shown in FIG. 5.

FIG. 5 is a block diagram exemplifying the structure of the mobile terminal according to this embodiment. FIG. 6 shows schematic diagrams describing the operation of a vibrator of the mobile terminal shown in FIG. 5.

As shown in FIG. 5, mobile terminal 10 has sensor 11 that detects the tilt angle of mobile terminal 10; sensor control circuit 12 that detects the attitude of mobile terminal 10 based on a signal received from sensor 11; vibrator 13 and vibrator 14 that generate vibrations in different directions; motor control circuit 15 that controls motors of vibrators 13 and 14; and CPU 16 that determines whether vibrator 13 or vibrator 14 is to be operated based on the attitude of mobile terminal 10. CPU 16 reads a program from memory (not shown) and executes a process according to the program.

Vibrator 13 has horizontal motor 31 mounted in parallel with the enclosure of mobile terminal 10; and horizontal eccentric member 32 mounted on the spindle of horizontal motor 31. Vibrator 14 has vertical motor 41 vertically mounted on the enclosure of mobile terminal 10; and vertical eccentric member 42 mounted on the spindle of vertical motor 41. Next, with reference to FIG. 6, the structures of vibrators 13 and 14 will be described in detail.

FIG. 6(a) is a perspective view showing the appearance of mobile terminal 10 shown in FIG. 5. Mobile terminal 10 is a foldable mobile phone composed of lid section 21 and body section 22. FIG. 6(a) shows that lid section 21 has been opened. Assuming that body section 22 formed in a rectangular parallelepiped shape has been placed horizontal on a desk in the state shown in FIG. 6(a), in which the shorter side direction of body section 22 is the X axis direction, and in which the longer side direction of body section 22 is the Y axis direction, the operation surface of body section 22 becomes perpendicular to the Z axis direction. In this embodiment, as shown in FIG. 6(a), it is assumed that lid section 21 of mobile terminal 10 has been opened. It should be noted that lid section 21 may be closed.

FIG. 6(b) is a schematic diagram showing substrate 51 provided in body section 22 of mobile terminal 10 that has been placed on a desk in the state shown in FIG. 6(a). As shown in FIG. 6(b), horizontal motor 31 is mounted on substrate 51 in parallel with the longer side of body section 22 of mobile terminal 10. Horizontal eccentric member 32 is mounted on the spindle of horizontal motor 31. The direction of the spindle of horizontal motor 31 matches the Y axis. Vertical motor 41 is mounted perpendicular to the upper surface of substrate 51. Vertical eccentric member 42 is mounted on the spindle of vertical motor 41. The direction of the spindle of vertical motor 41 matches the Z axis.

Sensor 11 is, for example, an acceleration sensor that detects the tilt angle of mobile terminal 10 based on the direction of gravity and transmits an angle signal including information about the detected angle to sensor control circuit 12.

When sensor control circuit 12 receives the angle signal from sensor 11, sensor control circuit 12 determines the attitude of mobile terminal 10 based on the information about the angle represented by the angle signal and transmits an attitude detection signal including the information of the determined result to CPU 16. If mobile terminal 10 has been placed in the state shown in FIG. 6(a), sensor control circuit 12 determines that the attitude of mobile terminal 10 is "horizontal direction." In contrast, if the longer side direction of body section 22 matches the Z axis direction, sensor control circuit 12 determines that the attitude of mobile terminal 10 is "vertical direction."

If motor control circuit 15 receives a horizontal drive control signal that is a control signal that drives horizontal motor 31 from CPU 16, motor control circuit 15 drives horizontal motor 31. In contrast, if motor control circuit 15 receives a vertical drive control signal that is a control signal that drives vertical motor 41 from CPU 16, motor control circuit 15 drives vertical motor 41.

When CPU 16 receives the attitude detection signal from sensor control circuit 12, CPU 16 extracts information about the attitude of mobile terminal 10 from the attitude detection signal and determines whether the attitude of mobile terminal 10 is the vertical direction or the horizontal direction. If the user has placed mobile terminal 10 in his or her pocket or the like, CPU 16 determines that the attitude of mobile terminal 10 is the vertical direction. If body section 22 of mobile terminal 10 has been placed horizontal on a desk, CPU 16 determines that the attitude of mobile terminal 10 is the horizontal direction. If the extracted information about the attitude of mobile terminal 10 is the horizontal direction, CPU 16 transmits the vertical drive signal to motor control circuit 15. In contrast, if the attitude of mobile terminal 10 is the vertical direction, CPU 16 transmits the horizontal drive signal to motor control circuit 15.

In this embodiment, sensor control circuit 12 determines the attitude of mobile terminal 10 based on the angle signal received from sensor 11 and notifies CPU 16 of the attitude of mobile terminal 10. Alternatively, sensor control circuit 12 may be omitted from mobile terminal 10. In this case, CPU 16 determines the attitude of mobile terminal 10 based on the angle signal received from sensor 11.

Figure 7:
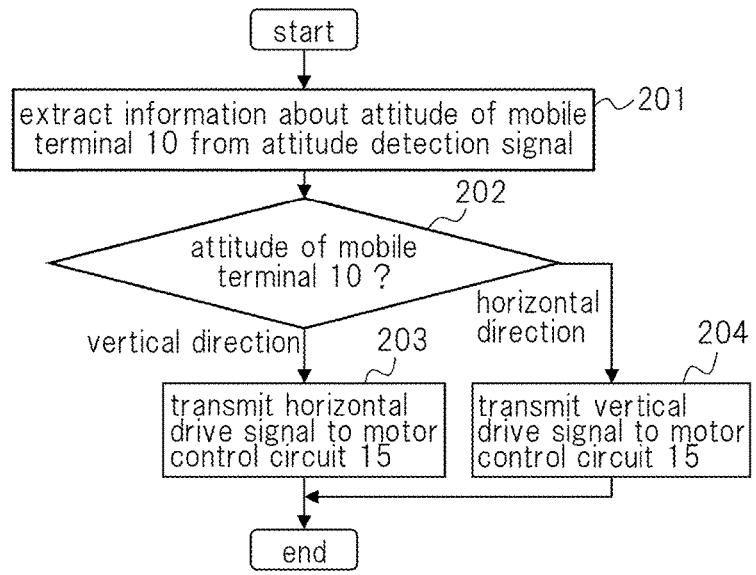
FIG. 7 is a flow chart showing the procedure of the mobile terminal according to the first embodiment of the present invention.

Next, the operation of mobile terminal 10 according to this embodiment will be described. FIG. 7 is a flow chart showing the procedure of the mobile terminal according to this embodiment.

When mobile terminal 10 is receiving an incoming call as one kind of information of which mobile terminal 10 needs to notify to the user, CPU 16 extracts information about the attitude of mobile terminal 10 from the attitude detection signal received from sensor control circuit 12 (at step 201) and determines whether the attitude of mobile terminal 10 is the horizontal direction or the vertical direction (at step 202). If the determined result at step 202 denotes that the attitude of mobile terminal 10 is the vertical direction, CPU 16 transmits the horizontal drive signal to motor control circuit 15 (at step 203). When motor control circuit 15 receives the horizontal drive signal from CPU 16, motor control circuit 15 drives horizontal motor 31.

When horizontal motor 31 rotates, horizontal eccentric member 32 rotates about the Y axis on the ZX plane perpendicular thereto and thereby mobile terminal 10 generates vibrations in the direction in parallel with the ZX plane. If the user has placed mobile terminal 10 in his or her pocket or the like, CPU 16 determines that the attitude of mobile terminal 10 is the vertical direction. Thus, when horizontal motor 31 rotates, since the vibration surface is perpendicular to the surface of the user's body, the vibrations are easily transferred to the user's body.

In contrast, if the determined result at step 202 denotes that the attitude of mobile terminal 10 is the horizontal direction, CPU 16 transmits the vertical drive signal to motor control circuit 15 (at step 204). When motor control circuit 15 receives the vertical drive signal from CPU 16, motor control circuit 15 drives vertical motor 41. When vertical motor 41 rotates, vertical eccentric member 42 rotates about the Z axis on the XY plane perpendicular thereto. As a result, mobile terminal 10 generates vibrations in the direction perpendicular to the XY plane.

If mobile terminal 10 has been placed on a desk or the like such that body section 22 becomes horizontal and the vibration surface of the vibrator is perpendicular to the surface of the desk, mobile terminal 10 hops on the desk and creates an unpleasant rattle-like sound. In this embodiment, however, the vibration surface of vibrator 14 is parallel to the surface of the desk. Thus, vibrator 14 generates fewer vibrations than vibrator 13 whose vibration surface is perpendicular to the surface of the desk and thereby prevents the occurrence of unpleasant sounds.

The user may place mobile terminal 10 on a desk in such a manner that the attitude of mobile terminal 10 becomes the horizontal direction as shown in FIG. 6. Alternately, the user may place mobile terminal 10 on a charger stand such that the attitude of mobile terminal 10 becomes the vertical direction. In this case, sensor control circuit 12 determines that the attitude of mobile terminal 10 is the vertical direction based on the detection signal received from sensor 11 and CPU 16 controls motor control circuit 15 at step 203. However, since the vibration surface of vibrator 13 is parallel to the surface of the desk, the occurrence of unpleasant sounds can be prevented.

If the user has placed mobile terminal 10 in his or her pocket or the like and if the longer side direction of the enclosure of mobile terminal 10 is parallel to the direction of gravity, since the vibration surface of mobile terminal 10 is perpendicular to the surface of his or her body, the vibrations are easily transferred to his or her body. On the other hand, if the user has placed mobile terminal 10 on a desk such that the longer side direction of the enclosure is parallel to the surface of the desk, since the vibration surface of vibrator 14 is parallel to the surface of the desk, mobile terminal 10 generates fewer vibrations than the case in which the vibration surface is perpendicular to the surface of the desk and thereby the occurrence of unpleasant sounds is prevented.

If mobile terminal 10 that has been placed on a desk is covered with a document or the like, the "visual means" disclosed in Patent Literature 1 can not notify the user that the mobile terminal is receiving an incoming call. In contrast, although the vibration sound of vibrator 14 is weaker than that of vibrator 13, since vibrator 14 vibrates between mobile terminal 10 and the desk, it is likely that the user will know that the mobile terminal is receiving an incoming call.

Second Embodiment

According to a second embodiment of the present invention, if the attitude of mobile terminal 10 according to the first embodiment is the horizontal direction, mobile terminal 10 will not only vibrate with the vibrator function, but will also notify the user that mobile terminal 10 is receiving an incoming call through a visual effect.

Figure 8:
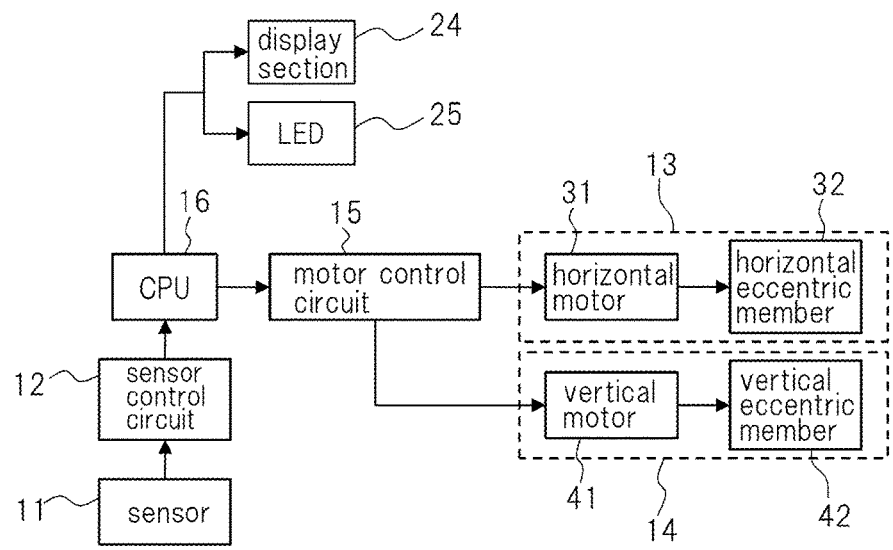
FIG. 8 is a block diagram exemplifying the structure of a mobile terminal according to a second embodiment of the present invention.
Figure 9:
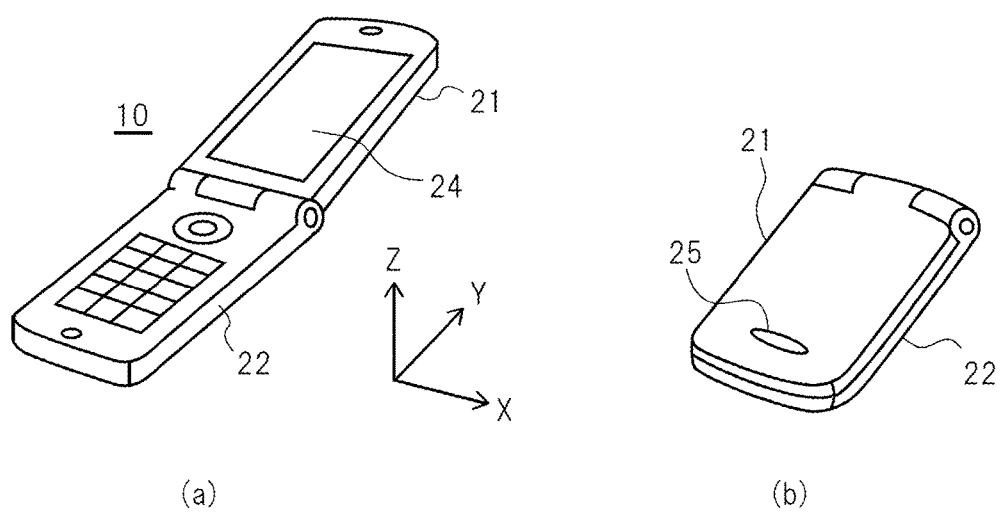
FIG. 9 shows perspective views of appearance of the mobile terminal according to the second embodiment of the present invention.

Next, the structure of the mobile terminal according to the second embodiment will be described. FIG. 8 is a block diagram exemplifying the structure of the mobile terminal according to this embodiment. FIG. 9 shows perspective views of the appearance of the mobile terminal according to this embodiment. FIG. 9(a) shows that lid section 21 of mobile terminal 10 is in the open state. FIG. 9(b) shows that lid section 21 of mobile terminal 10 is closed. In this embodiment, a detailed description of similar portions to those in the first embodiment will be omitted.

As shown in FIG. 8, CPU 16 is connected to display section 24 shown in FIG. 9(a) and LED (Light Emitting Diode) 26 shown in FIG. 9(b) through respective signal lines. If CPU 16 determines that the attitude of mobile terminal 10 is the horizontal direction based on the attitude detection signal received from sensor control circuit 12, CPU 16 transmits the vertical drive signal to motor control circuit 15 and causes vibrator 14 to display a message, that denotes that mobile terminal 10 is receiving an incoming call, or LED 25 to light.

Since the operation of mobile terminal 10 according to the second embodiment is the same as that according to the first embodiment except that if the attitude of mobile terminal 10 is the horizontal direction, CPU 16 causes display section 24 to display the foregoing message or LED 25 to light, a detailed description of the operation of the mobile terminal according to this embodiment will be omitted.

In the first embodiment, if mobile terminal 10 has been placed horizontal on a desk, since vibrations that notify the user that mobile terminal 10 is receiving an incoming call are prevented, it is likely that the user does not know that mobile terminal 10 is receiving an incoming call. By contrast, in the second embodiment, unless mobile terminal 10 is covered with a document or the like, since mobile terminal 10 provides a visual effect that causes display section 24 to display a message or LED 25 to light, it is likely that the user knows that mobile terminal 10 is receiving an incoming call.

Third Embodiment

A third embodiment of the present invention is different from the first embodiment in structures of the vibrator function.

Figure 10:
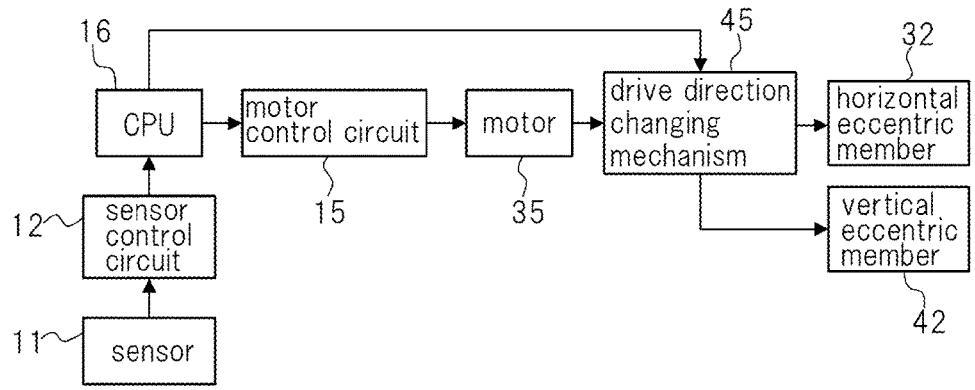
FIG. 10 is a block diagram exemplifying the structure of a mobile terminal according to a third embodiment of the present invention.
Figure 11:
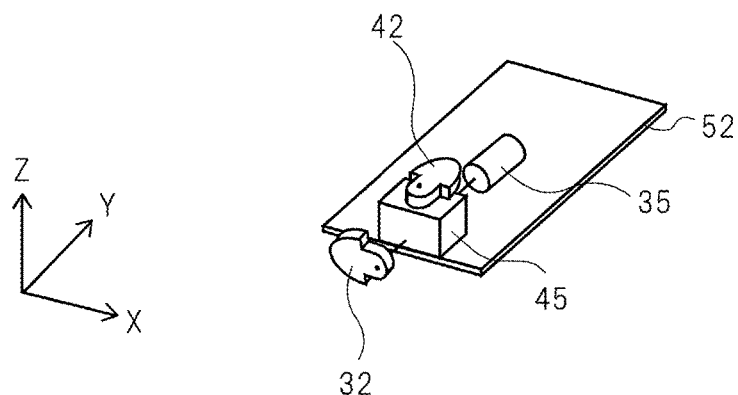
FIG. 11 is a schematic diagram showing a substrate provided in a body section of the mobile terminal shown in FIG. 10.

Next, the structure of the mobile terminal according to the third embodiment will be described. In the third embodiment, a detailed description of portions similar to those in the first embodiment will be omitted. FIG. 10 is a block diagram exemplifying the structure of the mobile terminal according to the third embodiment. FIG. 11 is a schematic diagram showing a substrate provided in the body section of the mobile terminal shown in FIG. 10.

As shown in FIG. 10 and FIG. 11, the mobile terminal according to the third embodiment has motor 35 instead of horizontal motor 31 and vertical motor 41; and drive direction changing mechanism 45 that changes the drive directions of motor 35 for horizontal member 32 and vertical member 42.

When mobile terminal 10 is receiving an incoming call, CPU 16 extracts information about the attitude of mobile terminal 10 from the attitude detection signal received from sensor control circuit 12. If the attitude of mobile terminal 10 is the horizontal direction, CPU 16 transmits a horizontal rotation signal that causes vertical eccentric member 42 to rotate to drive direction changing mechanism 45. In contrast, if the attitude of mobile terminal 10 is the vertical direction, CPU 16 transmits a horizontal rotation signal that causes vertical motor 41 to rotate to drive direction changing mechanism 45. In addition, CPU 16 drives motor 35. If drive direction changing mechanism 45 receives the vertical rotation signal from CPU 16, drive direction changing mechanism 45 transfers the rotation force of motor 35 to vertical eccentric member 42. In contrast, if drive direction changing mechanism 45 receives the horizontal rotation signal from CPU 16, drive direction changing mechanism 45 transfers the rotation force of motor 35 to horizontal eccentric member 32.

Since the operation for which the mobile terminal controls the vibration surface according to the third embodiment is the same as that according to the first embodiment except for the structures of the vibration means, their detailed description will be omitted.

According to the third embodiment, since the number of motors is decreased to one, the cost of the mobile terminal according to the third embodiment can be reduced compared to the mobile terminal according to the foregoing embodiments.

Fourth Embodiment

According to a fourth embodiment of the present invention, the drive direction changing mechanism shown in FIG. 10 includes attitude detection means that detects the attitude of the mobile terminal.

Figure 12:
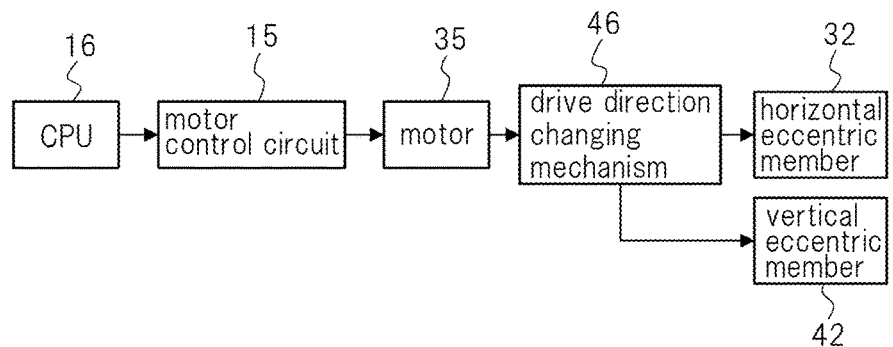
FIG. 12 is a block diagram exemplifying the structure of a mobile terminal according to a fourth embodiment of the present invention.

Next, the structure of the mobile terminal according to the fourth embodiment will be described. FIG. 12 is a block diagram exemplifying the structure of mobile terminal according to this embodiment. In the fourth embodiment, a detailed description of similar portions to those in the third embodiment will be omitted.

Drive direction changing mechanism 46 according to the fourth embodiment is different from drive direction changing mechanism 45 according to the third embodiment in that the former has an acceleration sensor corresponding to sensor 11; and a circuit corresponding to sensor control circuit 12. However, drive direction changing mechanism 46 according to the fourth embodiment does not need to receive the horizontal rotation signal and the vertical rotation signal from CPU 16. Instead, when motor 35 operates, CPU 16 detects the attitude of the mobile terminal, controls the mobile terminal in the same manner as shown in FIG. 7 based on the detected attitude, and causes the mobile terminal to generate vibrations.

In this embodiment, drive direction changing mechanism 46 includes sensor 11 and sensor control circuit 12. Alternatively, a weight may be provided in drive direction changing mechanism 46, drive direction changing mechanism 46 may detect the direction of gravity based on the weight, and may change the supply destination of the drive force of motor 35 to horizontal eccentric member 32 or vertical eccentric member 42 based on the detected direction of gravity through mechanical gears.

In the fourth embodiment, since CPU 16 does not need to determine the attitude of the mobile terminal, the load imposed on CPU 16 can be reduced.

The foregoing first to fourth embodiments are applied to foldable mobile phones. Alternatively, the foregoing first to fourth embodiments may be applied to mobile phones of other types such as slidable mobile phones instead of foldable mobile phones.

In the foregoing first to fourth embodiments, the number of vibrators is two. Alternatively, the number of vibrators may be three or more. In this case, vibrators are adequately operated corresponding to the attitude of the three directions.

In the foregoing first to fourth embodiments, if the attitude of mobile terminal 10 is the horizontal direction, after CPU 16 receives information concerning which CPU 16 notifies the user until an elapse of a predetermined time period, CPU 16 causes vertical eccentric member 42 to rotate. If the user does not stop the operation of the vibrator after an elapse of the predetermined time period, CPU 16 may determined that it is likely that the user does not know that the mobile terminal is receiving an incoming call and may change the eccentric member to be rotated to horizontal eccentric member 32.

Alternatively, the second embodiment of the present invention may be applied to the mobile terminal according to any one of the first, third, and fourth embodiments. The present invention is not limited to devices and methods, but can be applied to programs that cause computers to execute the notifying methods according to the foregoing embodiments. Alternatively, the present invention may be computer readable record mediums on which the programs are recorded.

As an exemplary advantage according to the invention, even if the device has been placed horizontal on a desk and is hidden from the view of the user, the device vibrates so as to notify the user that the device is receiving an incoming call concerning which unpleasant sounds have been prevented.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2011-150301 filed on Jul. 6, 2011, the content of which is incorporated by reference.

DESCRIPTION OF REFERENCE NUMERALS

1 Notifying device
2 Attitude detection means
3 Selection means
4, 5 Vibration means
10 Mobile terminal
11 Sensor
12 Sensor control circuit
13, 14 Vibrators
15 Motor control circuit
16 CPU

The invention claimed is:

1. A notifying device in a communication device, comprising:
a first vibrator for generating vibrations in a first direction, wherein said first vibrator generates vibrations on a surface perpendicular to a longer side direction of an enclosure of said notifying device;
a second vibrator for generating vibrations in a second direction, wherein said second vibrator generates vibrations on a surface parallel to said longer side direction of said enclosure of said notifying device;
an attitude detector for detecting an attitude of the communication device; and
a selector for:
selecting, based on said detected attitude, at least one of said first vibrator and said second vibrator to be operated, and
selecting the other vibrator to be operated in a case a command for stopping the selected vibrator is not input for a predetermined time period,
wherein said selector:
selects said second vibrator to be operated when said attitude denotes that said longer side direction of said enclosure of said notifying device is perpendicular to a direction of gravity, and
selects said first vibrator to be operated when a command that stops said second vibrator is not input after an elapse of said predetermined time period.

2. A notifying method for a communication device, comprising:
detecting an attitude of the communication device;
selecting, at a selector, based on said detected attitude, at least one of first and second vibrators to be operated, from among said first and second vibrators that generate vibrations in first and second directions respectively; and
selecting, at said selector, the other vibrator to be operated in a case a command for stopping said selected vibrator is not input for a predetermined time period,
wherein the communication device comprises a notifying device,
wherein said first vibrator generates vibrations on a surface perpendicular to a longer side direction of an enclosure of said notifying device,
wherein said second vibrator generates vibrations on a surface parallel to said longer side direction of said enclosure of said notifying device, and
wherein said selector:
selects said second vibrator to be operated when said attitude denotes that said longer side direction of said enclosure of said notifying device is perpendicular to a direction of gravity, and
selects said first vibrator to be operated when a command that stops said second vibrator is not input after an elapse of said predetermined time period.

3. A non-transitory computer readable record medium on which a program is recorded, the program causing a computer to control first and second vibrators that generate vibrations in first and second directions respectively, the program comprising:
detecting an attitude of a communication device;
selecting, at a selector, based on said detected attitude, at least one of said first vibrator and said second vibrator to be operated; and
selecting, at said selector, the other vibrator to be operated in a case a command for stopping said selected vibrator is not input for a predetermined time period,
wherein the communication device comprises a notifying device,
wherein said first vibrator generates vibrations on a surface perpendicular to a longer side direction of an enclosure of said notifying device,
wherein said second vibrator generates vibrations on a surface parallel to said longer side direction of said enclosure of said notifying device, and
wherein said selector:
selects said second vibrator to be operated when said attitude denotes that said longer side direction of said enclosure of said notifying device is perpendicular to a direction of gravity, and
selects said first vibrator to be operated when a command that stops said second vibrator is not input after an elapse of said predetermined time period.

4. The notifying device according to claim 1, further comprising:
a motor generating vibrations; and
a drive direction changer transferring drive force of said motor to one vibrator selected by said selector from said first vibrator or said second vibrator,
wherein said first vibrator has a first eccentric member generating vibrations on the surface perpendicular to the longer side direction of the enclosure of the notifying device, and
wherein said second vibrator has a second eccentric member generating vibrations on the surface parallel to the longer side direction of the enclosure of the notifying device.

5. The notifying device according to claim 4, wherein said drive director changer includes at least one of said attitude detector and said selector.

6. The notifying device according to claim 1, further comprising:
   a display section or a light emitting section,
   wherein said selector causes said display section to display a message containing information about which said notifying device notifies a user or causes said light emitting section to light if said attitude denotes that the longer side direction of the enclosure of said notifying device is perpendicular to the direction of gravity.

7. The notifying device according to claim 4, further comprising:
   a display section or a light emitting section,
   wherein said selector causes said display section to display a message containing information about which said notifying device notifies a user or causes said light emitting section to light if said attitude denotes that the longer side direction of the enclosure of said notifying device is perpendicular to the direction of gravity.

8. The notifying device according to claim 5, further comprising:
   a display section or a light emitting section,
   wherein said selector causes said display section to display a message containing information about which said notifying device notifies a user or causes said light emitting section to light if said attitude denotes that the longer side direction of the enclosure of said notifying device is perpendicular to the direction of gravity.

9. The notifying device according to claim 1, wherein said enclosure has a rectangular surface whose shape is formed from a first side that is parallel to said longer side direction and a second side that is perpendicular to said longer side direction.

* * * * *